J. H. SIMPSON.
TOY.
APPLICATION FILED DEC. 19, 1917.
Reissued Jan. 22, 1918.
14,425.
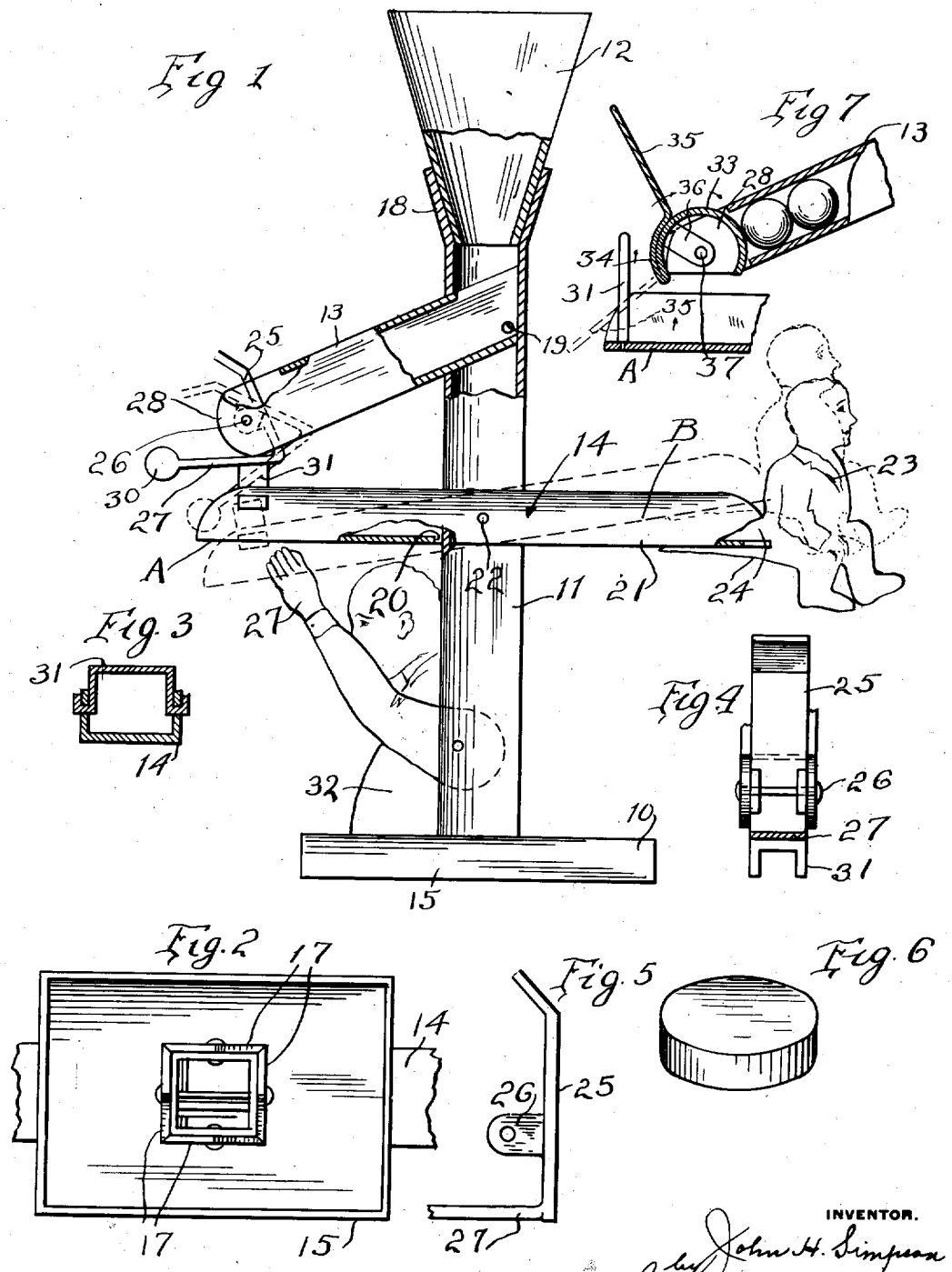
INVENTOR.
by John H. Simpson
Sydney Brown Bracey
Lickner & Fowler.

UNITED STATES PATENT OFFICE.

JOHN H. SIMPSON, OF PROVIDENCE, RHODE ISLAND, ASSIGNOR TO BENJAMIN F. BAIN, OF PITTSBURGH, PENNSYLVANIA.

TOY.

14,425. Specification of Reissued Letters Patent. Reissued Jan. 22, 1918.

Original No. 1,167,945, dated January 11, 1916, Serial No. 16,691, filed March 24, 1915. Application for reissue filed December 19, 1917. Serial No. 207,978.

*To all whom it may concern:*

Be it known that I, JOHN H. SIMPSON, a citizen of the United States, residing at Providence, in the county of Providence and State of Rhode Island, have invented certain new and useful Improvements in Toys, of which the following is a specification, reference being had to the accompanying drawings.

My present invention relates to new and useful improvements in toys and has particular reference to those of the type in which a see-saw carrying a manikin is operated by marbles, grain or some other material delivered periodically on to the see-saw.

A still further object of the invention is to construct a toy of this character which is relatively simple in design and may be cheaply manufactured from sheet metal, cardboard or any similar material.

The above and other incidental objects of a similar nature which will be hereinafter more specifically treated are accomplished by such means as are illustrated in the accompanying drawings, described in the following specification and then more particularly pointed out in the claims which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a composite view partly in section and partly in side elevation of the toy with parts thereof removed in operative relation; Fig. 2 is a plan view of the base of the toy, looked at from the under side thereof; Fig. 3 is a detail transverse section showing the manner in which the trip member is carried by the chute; Fig. 4 is a face view of the valve employed in controlling the exit of the grain or similar material from the chute on to the see-saw; Fig. 5 is a detail view of the grain valve; Fig. 6 is a detail view of the disk which may be employed in operating the see-saw; and Fig. 7 is a detail view in longitudinal section of the chute equipped with the modified form of valve employed in controlling the discharge of marbles or similar elements.

As embodied in the accompanying drawings and as best disclosed as an operative entirety in Fig. 1 thereof, the toy includes a base 10, a standard 11 having a hopper 12, a discharge chute or run-way 13 and a see-saw 14. The base 10 is, as are all other parts of the toy, preferably formed of sheet metal, although card-board or any other desired material may be employed, without departing in any way from the spirit of the invention. The edges of the base 10 are bent to produce rectangularly extending flanges 15. In the center of the base is formed a rectangular opening 16 into which the lower end of the standard 11 projects. The four segments of material of the base which are removed to form this opening are directed downwardly, forming flanges 17 which are riveted to or otherwise secured to the faces of the standard 11. As shown, the standard is hollow and formed from a strip of sheet metal and is provided at its upper terminal with the outwardly inclined flanges or plates 18 which define a flared mouth into which the lower terminal of the frusto-pyramidal hopper is received. In one wall of the standard, adjacent the upper terminal thereof, is formed an opening, through which projects the inner end of the discharge chute or run-way 13. The upper wall of the member 13 at the inner end thereof, is cut-away so that material may pass from the hopper into the member 13. A transverse pin 19 is passed through the standard and inner end of the discharge chute for attaching this member to the standard.

The see-saw heretofore designated by the numeral 14 is channel-shaped and is provided in its bottom wall and intermediate the length thereof with an opening 20 which receives the standard and permits the side walls 21 to be pivotally secured to the standard, as by a pin 22. The one end of the see-saw is arranged below the outer end of the discharge chute 13, as shown best in Fig. 1. The other end of the see-saw carries a manikin 23 which is provided with spaced spring fingers 24. These fingers 24 are adapted to straddle the bottom wall of the see-saw and to frictionally engage therewith for holding the manikin in proper position. These fingers are relatively long so that the manikin may be adjusted toward or away from the pivotal point of the see-saw to compensate for the difference in weight of different materials which may be poured into the hopper to supply the motive force or swing the see-saw.

It will now be seen that by periodically discharging material from the discharge chute 13, the see-saw will be swung at intervals against the weight of the manikin which normally tends to hold at the lowest elevation, that end of the see-saw to which it is attached. Preferably grain or some equivalent material of a similar nature is employed in this connection, although marbles or spherical weights may be employed.

As a means for intermittently dropping small quantities of grain on to the see-saw, so that this member will be continuously operated, as long as the supply of grain lasts, I employ a valve plate which, as illustrated in Fig. 1, includes a body portion 25 having right-angularly extending attaching ears 26 and a balance arm 27. The ears 26 are adapted to receive a pivot pin by which the body member is pivotally secured between the projecting end plates 28 formed on the side walls of the discharge chute. The balance arm is provided at its outer end with a piece of lead or equivalent material 30 which is of such weight that it normally tends to hold the body plate in engagement with the adjacent edge of the bottom wall of the discharge chute, so that the grain contained therein is held against exit. A substantially U-shaped trip member 31 rises from that end of the see-saw which is beneath the discharge chute. This trip member is adapted to engage the arm 27 for operating the valve, as will be next described.

When, as shown in Fig. 1 the see-saw is in normal position with the manikin carrying end B at lower elevation, the trip 31 is disposed to support the arm 27 in such position that the body plate of the valve is held in open position by the weight 30. Thus, it will be seen that if grain is poured into the hopper, it may pass through the chute on to the see-saw. When an amount of grain slightly greater in weight than the manikin has passed on to the see-saw, the end A of this member will be swung downwardly. The downward movement of the end A will withdraw the trip from engagement with the arm 27, allowing the weight 30 of this member to swing the valve to a closed position, preventing the further exit of the remaining grain. When the end A of the see-saw reaches its lowest position, the grain will slide off, allowing the weight of the manikin on the end B to again return the see-saw to normal position. This upward swinging of the end A will cause the trip to engage with the arm 27, raising this member and allowing another supply of grain to drop on to the see-saw. The valve is, of course, designed to open at the moment the see-saw reaches its normal position.

When it is desired to employ marbles or the like, as means for operating the see-saw, I employ a valve of the type illustrated in detail in Figs. 4 and 7. Referring particularly to this figure, it will be seen that this marble valve is formed from a single blank of sheet metal, which is bent to produce a substantially semi-circular body portion 33. The blank from which the valve is formed is rebent about the outer face of the body 33, as indicated at 34 and is then directed outwardly forming a balance arm 35. A pair of apertured ears 36 are formed integrally with the curved edges of the valve body 33. These ears 36 extend inwardly toward the center from which the member 33 is described. The terminals of the ears are mounted on a pivot pin 37 which extends transversely between the extensions 28 of the chute and serve as a pivotal support for the valve.

Regarding the operation of the marble valve, it is to be explained that the balance arm 35 of this member normally tends to fall by gravity to maintain the valve body 33 in receiving relation to the chute 15. When the marbles are poured into the hopper and passed down the chute, one of them enters the valve body. The operator may then put the see-saw in operation by lifting the balance arm 35 to permit the marble contained within the valve body to drop on to the see-saw, in the manner disclosed in Fig. 7. When the valve body moves into open position the one end of the valve moves across the lower end of the chute, thus holding the remaining marbles therein. The first marble dropping on the see-saw causes the end A of this member to swing downwardly against the weight of the manikin on the end B. The balance arm 35, of course falls immediately by gravity to its normal position shown by dotted lines in Fig. 7. In this position of the valve, the space between the ends of the valve body 33 is in communication with the chute so that another ball may pass into the valve body. When the end A of the see-saw has been swung downwardly, some distance, the marble rolls out and the manikin again swings the end A upwardly. As the end A swings upwardly the trip 31 strikes the arm 35, swinging this member upwardly as in Fig. 7, so that the valve body 33 will be rotated on its pivot pin 37, allowing the next marble to drop on to the see-saw.

From the foregoing description, it will now be apparent that I have provided a relatively simple toy, in which the see-saw may be continuously operated by a supply of marbles, balls or the like which are periodically allowed to fall upon the see-saw by a valve which is automatically operated by the see-saw.

At the lower end of the standard, I preferably mount a manikin indicated at 32, the arms of which are raised to convey the impression that the manikin is lifting the adjacent terminal of the see-saw in opposition to the efforts of the manikin on the other end of the see-saw.

As a substitute for the marbles, disks of metal, wood or any other material of the design shown in Fig. 6, may be employed. Any loose material in bulk, such as coffee, beans or sand may be substituted for grain, if desired.

In reduction to practice, it has been found that the form of this invention illustrated in the drawings, and referred to in the above description as the prefererd embodiment, is the most efficient and practical, yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:

1. A toy including a standard, a see-saw pivoted thereto, a hopper carried by the standard, a chute communicating with the hopper, and having its outer end arranged to deliver material to one end of the see-saw, a valve for the outer end of the chute, means carried by the see-saw for normally holding the valve in open position, and means for automatically moving the valve to closed position when said first mentioned means moves away from the valve upon the swinging of the see-saw.

2. A toy including a hollow standard, a hopper mounted in the upper end thereof, a discharge chute having its inner end extending into the standard to receive material from the hopper, a valve carried by the outer end of the chute for controlling the discharge of material therefrom, a see-saw pivotally attached to the standard, a longitudinally adjustable manikin attached to one end of the see-saw, and a valve trip member carried by the other end of the see-saw, said manikin being adapted to normally hold the trip member in engagement with the valve for maintaining the same in open position.

3. A toy including a hollow standard, a hopper mounted in the upper end thereof, a discharge chute having its inner end extending into the standard to receive material from the hopper, a valve carried by the outer end of the chute for controlling the discharge of material therefrom, a see-saw pivotally attached to the standard, a longitudinally adjustable manikin attached to one end of the see-saw, said manikin being adapted to normally hold the opposite end of the see-saw in engagement with the valve for maintaining the same in open position, and a counter-balance carried by the valve for moving the same in closed position, immediately subsequent to the discharging of material upon the see-saw sufficient to cause the swinging of the same.

4. A toy including a standard, a see-saw pivoted thereto, a chute having its outer end arranged to deliver material to one end of the see-saw, a valve for the outer end of the chute, means carried by the see-saw for normally holding the valve in open position, and means for automatically moving the valve to closed position when said first mentioned means moves away from the valve upon the swinging of the see-saw.

5. A toy including a support, a see-saw pivoted thereto, an inclined chute having a discharge means at its lower end arranged to deliver material to one end of the see-saw, a device for controlling the passage of material through said means, means carried by the see-saw for moving the controlling device to discharge position as the end of the see-saw approaches the lower end of the chute, and means for moving the controlling means to non-discharging position when the end of the see-saw moves away from said lower end of the chute.

6. A toy including a support, a see-saw pivoted thereto, an inclined chute having a discharge means at its lower end in position to deliver material to one end of the see-saw, and means whereby the movement of the see-saw causes the intermittent discharge of material to the end thereof.

JOHN H. SIMPSON.